Patented Aug. 23, 1927.

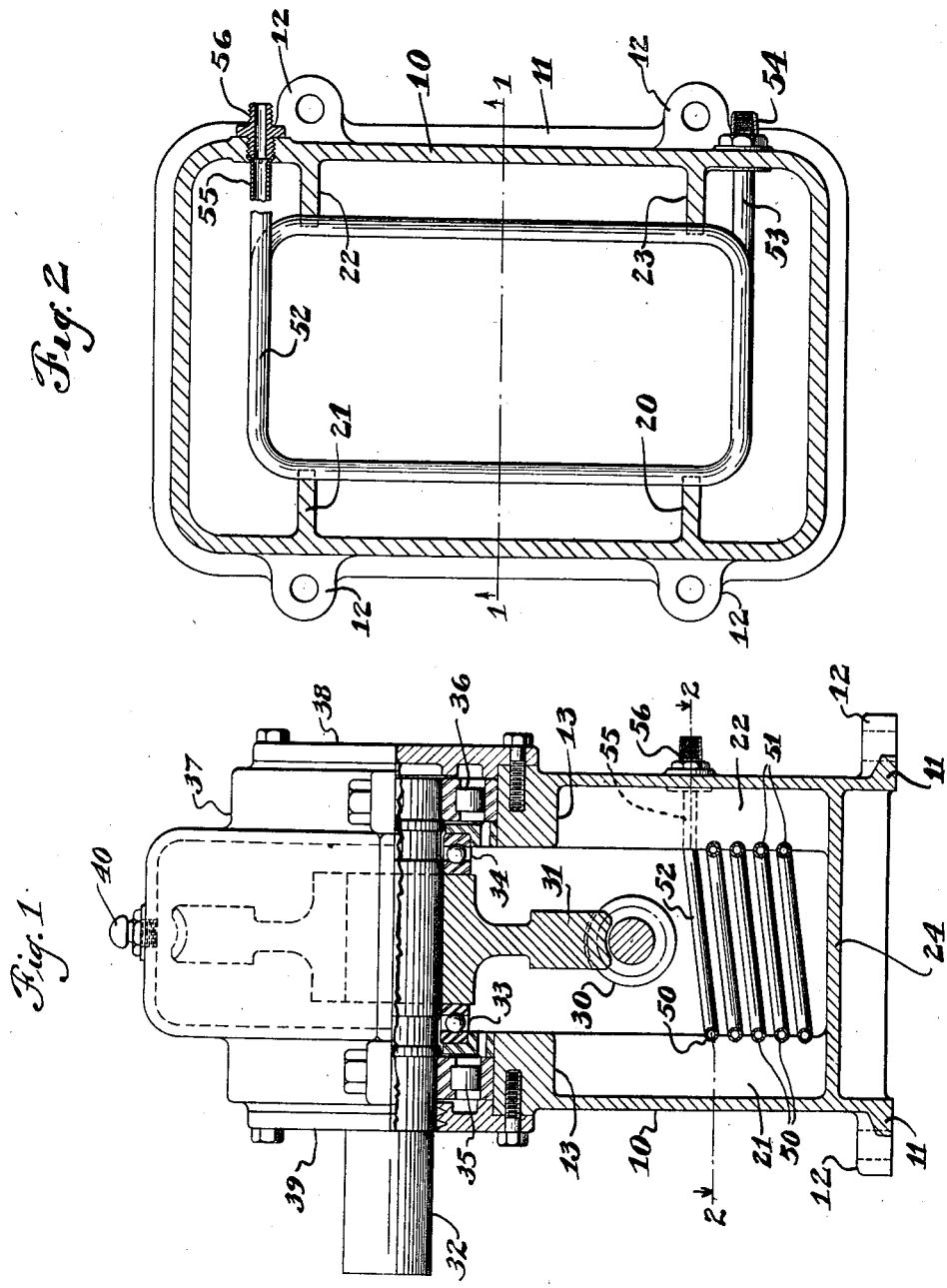

1,639,680

UNITED STATES PATENT OFFICE.

GEORGE H. ACKER, OF CLEVELAND, OHIO, ASSIGNOR TO THE CLEVELAND WORM AND GEAR COMPANY, OF CLEVELAND, OHIO, A CORPORATION OF OHIO.

MACHINE ELEMENT.

Application filed December 15, 1924. Serial No. 755,854.

This invention relates especially to cooling devices for speed reduction gears, and retaining means therefor forming part of the gear housing. The cooling device is preferably supplied in the form of a coiled pipe through which a cooling medium can be circulated at any desired rate to stabilize the temperature of the gears. In the preferred form these pipes are positioned wholly or in part below the surface of oil which extends to a sufficient level in the gear housing to be agitated by the gear parts whereby it is moved or carried over them for the cooling and the lubricating of them. A cooling medium such as air, water, or oil is circulated through the pipes for the cooling of the lubricating oil. The structure is enclosed within a so-called gear housing, parts of which housing, intended primarily for imparting strength and rigidity thereto, are also used to support the cooling coil. These parts, or ribs, form continuous interconnections between the ledges supporting the bearings, and the base of the housing. It is advantageous to provide such an unbroken interconnection with a minimum of material. The walls of the housing may thus be made of relatively thin material in order to obtain a given ruggedness, and no openings in the walls are required in order to permit the insertion of the cooling device, as the cooling device may readily be inserted in the space between the ledges and sprung into place between the ribs. In this way the cooling device is fixedly positioned within the housing and may be placed in such close proximity to the gear elements as to absorb the heat readily therefrom.

In the accompanying drawings showing in a somewhat diagrammatic way an illustrative embodiment and arrangement of this invention:

Figure 1 is a view in elevation of one form of the invention, with parts broken away; and Figure 2 is a section taken on the line 2—2 of Figure 1.

Like reference characters denote like parts in the figures.

Referring to the drawing, there is shown a housing 10 having a flanged bottom edge 11 to form a base. A plurality of spaced bolt lugs such as 12, 12 are provided, each having a vertical aperture for a suitable lag screw or hold down bolt (not shown) of conventional construction.

The upper end of the housing is provided with a pair of opposed inwardly extending ledges 13, 13 the upper faces of which are machined to provide a smooth, level surface.

A plurality of ribs such as 20, 21, 22 and 23, shown four in number, are provided on the inner wall of the housing, extending downwardly from the ledges 13, 13, and joined with the base, securing a rigid housing with a minimum weight of material and at low cost. The ribs extend inwardly into substantial alinement with the inner edges of the ledges 13, 13.

An important feature of the invention is that the lugs 12, 12 may be positioned in substantial alinement with the respective ribs, so that mechanical stresses and strains are transmitted directly to the fastening bolts. The structure is thus made more rigid and undesirable vibration reduced to a minimum.

A gear member is positioned within the housing, and as shown comprises a worm gear 30, meshing with a driving gear 31 which in turn is keyed to a drive shaft 32. The shaft 32 is rotatably mounted in suitable ball bearings 33 and 34 and is held in relatively fixed alinement therewith by means of usual thrust bearings 35 and 36. A housing cover 37 covers the upper portion of the structure and there is bolted thereto end caps 38 and 39. In the upper portion of the cover 37 there is provided an oil hole with a cap 40. By removing the cap 40, a lubricant such as machine oil, may be inserted into the housing in desired quantity.

The inner edges of the webs 20, 21, 22 and 23 are each provided with notches such as 50, 51. These notches are staggered with respect to each other, so that they describe a helicoidal figure. A coil of pipe 52 is formed into the same figure, and is engaged by the ribs. The dimensions of the coil of pipe so formed are such that the pipe can be sprung by virtue of its own elasticity and can be lowered into the space between the ledges 13 before the upper portion 37 is assembled to the structure. The coil has a lower end 53 which can be straightened out into the position shown in Figure 2 after the coil has been inserted and which is joined to a nipple 54 in the lower portion of the wall of the housing 10. The coil 52 has also an upper end 55 which can also be straightened during the assembling of the structure, and which is joined to a nipple 56 positioned in the wall of the housing 10. The nipples 54 and 56 are connected to an exterior circulating system of some heat absorbing medium such as water, and there is thus formed a temperature stabilizing means for the interior of the housing.

It will be noted that the base lugs 12 are in substantial alinement with the ribs 21, 22, 23 and 24 and it will be seen that I have provided a relatively inexpensive means of attachment of temperature stabilizers for gear housings and one which requires a minimum of parts and which may be readily assembled with little labor. A standard type of housing may be employed for installations in which no stabilizing means is to be provided and for those in which such means are to be employed. Thus temperature stabilizing may be readily installed whenever the need for it appears.

Furthermore the improved construction permits an increased spread of the coils, thereby allowing greater freedom of oil circulation about them and increasing their efficiency in cooling the oil. The invention also permits the coils to be positioned nearer the moving parts, thus absorbing the heat generated thereby more readily.

The cooling coil can be installed through the space between the ledges, as has been described, it being noted that no special aperture is required therefor. This feature is of importance as the housing can be made stronger with a minimum of material in its construction than is possible when a special opening for inserting the cooling coil is provided.

In the use of the cooled gear elements and housing of my invention lubricating oil is provided in the housing 10 as through opening 40 preferably up to such a level that it will be splashed or carried over the gears by their movement. A suitable cooling medium then being circulated through the coil 52 the lubricating oil is cooled and in turn acts as a cooling medium for the gears over which it is moved or carried. In other cases such as where only a slight degree of cooling effect is required to keep the gears at proper running temperature the air in housing 10 is cooled by means of cooling coils 52 and is utilized for the keeping of the gears at the proper running temperature, the circulation of the air in the housing 10 about the gears and the coils 52 being sufficient to carry excess heat from the gears to those coils.

While I have shown and described and have pointed out in the annexed claims certain novel features of my invention, it will be understood that various omissions, substitutions and changes in the forms and details of the device illustrated and in its operation may be made by those skilled in the art without departing from the spirit of my invention.

Having thus described my invention I claim:

1. A machine element comprising a housing, a moving member therein, a plurality of ribs extending inwardly from the inner face of the housing, and a cooling coil sprung into place within said ribs.

2. A machine element comprising a housing, a gear element therein, a plurality of notched ribs extending inwardly from the inner face of the housing, and a cooling coil sprung into engagement with the notches of the ribs.

3. A machine element comprising a housing, a moving member therein, a plurality of ribs extending inwardly from the inner face of the housing, a base lug for said housing in alinement with each of said ribs and a cooling coil sprung into place within said ribs.

4. A housing for gearing comprising unbroken side walls, a bottom, a pair of ledges on the upper edges of opposed side walls respectively extending inwardly into spaced relation and a plurality of spaced ribs joining the ledges and said bottom, and a temperature stabilizing device within the housing and sprung into position between and maintained in position by said ribs.

5. A housing for gearing comprising unbroken side walls, a bottom, a pair of ledges on the upper edges of opposed side walls respectively extending inwardly into spaced relation and a plurality of spaced ribs joining the ledges, a temperature stabilizing device within the housing maintained in position by said ribs, and lugs extending outwardly from the bottom of the said walls in alinement with the interiorly disposed ribs respectively.

6. A housing for gearing comprising unbroken side walls, a bottom, a pair of ledges on the upper edges of opposed side walls respectively extending inwardly into spaced relation and a plurality of spaced ribs joining the ledges and said bottom, and a temperature stabilizing device within the housing comprising a helical fluid conducting pipe maintained in position by said ribs.

In testimony whereof I have hereunto set my hand.

GEORGE H. ACKER.